United States Patent [19]
Kerbis et al.

[11] Patent Number: 5,769,360
[45] Date of Patent: Jun. 23, 1998

[54] EASY TRANSPORT SEAT

[75] Inventors: Steven Kerbis, Niagara Falls; Daniel D. Cook, Lancaster, both of N.Y.

[73] Assignee: Research Foundation of the State University of New York, Albany, N.Y.

[21] Appl. No.: 411,193

[22] Filed: Mar. 27, 1995

[51] Int. Cl.$^6$ ..................................................... B64D 11/06
[52] U.S. Cl. .................................. 244/118.6; 244/122 R; 280/250.1; 296/65.1; 297/248
[58] Field of Search ............................ 244/118.5, 118.6, 244/122 R; 280/250.1, 304.1, 647, 30; 296/65.1; 297/248, 232, 233, 257; 410/4

[56] References Cited

U.S. PATENT DOCUMENTS

| | | | |
|---|---|---|---|
| 3,618,968 | 11/1971 | Green | 280/250.1 |
| 3,955,847 | 5/1976 | Schiowitz | 410/4 |
| 4,278,387 | 7/1981 | Seguele et al. | 280/250.1 |
| 4,354,791 | 10/1982 | Antonellis | 280/304.1 |
| 4,457,551 | 7/1984 | Anthony | 296/65.1 |
| 4,678,202 | 7/1987 | Jensen et al. | 280/650 |
| 4,728,119 | 3/1988 | Seguela | 280/250.1 |
| 4,834,413 | 5/1989 | Patel et al. | 280/250.1 |
| 5,263,728 | 11/1993 | Patel et al. | 280/250.1 |
| 5,358,263 | 10/1994 | Aldur et al. | 280/647 |

FOREIGN PATENT DOCUMENTS

| | | | |
|---|---|---|---|
| 680359 | 2/1964 | Canada | 280/30 |
| 0071638 | 6/1981 | Japan | 297/248 |
| 106103 | 8/1963 | Netherlands | 297/248 |

*Primary Examiner*—Galen L. Barefoot
*Attorney, Agent, or Firm*—Bilicki & Simpson, P.C.

[57] ABSTRACT

A system for seating and transporting physically challenged individuals to and from commercial transport vehicles is disclosed. The system utilizes the aisle seat of the commercial transport vehicle for both seating and transporting the passenger. Modifications are made to both the aisle seat and the adjacent seat in order to provide a system capable of being detached while meeting all the safety and strength properties of the original seats. The present invention provides a very efficient and humane method of transporting physically challenged individuals from their wheelchairs to commercial transport vehicles as well as providing and efficient method of transportation when connections are necessary.

17 Claims, 8 Drawing Sheets

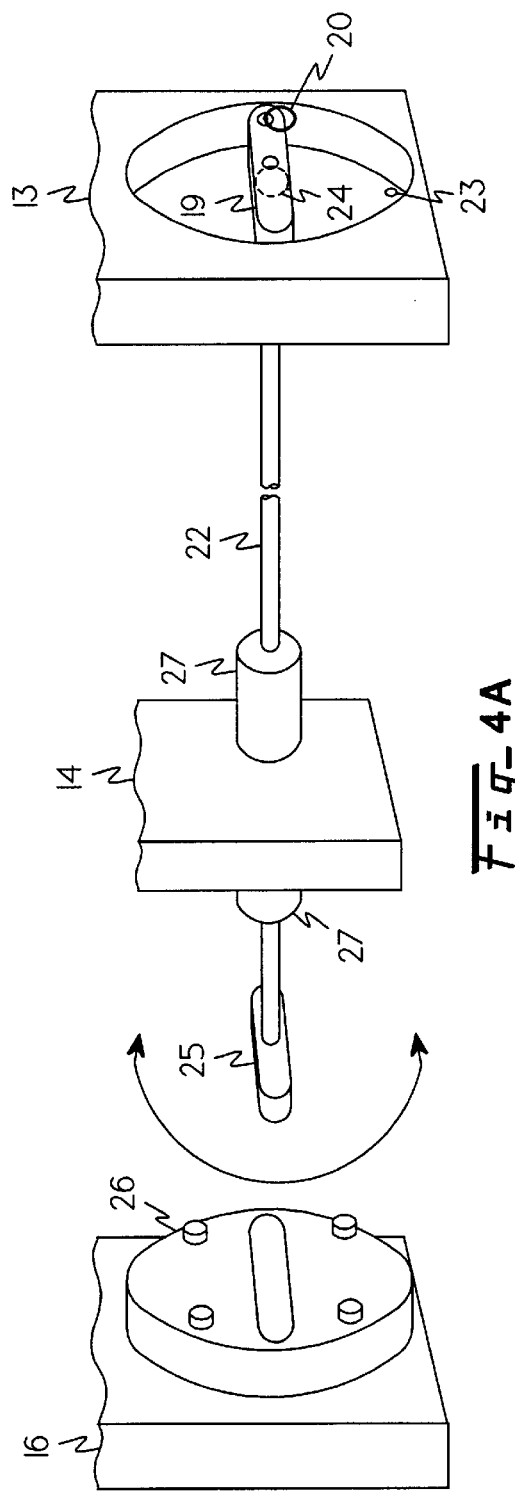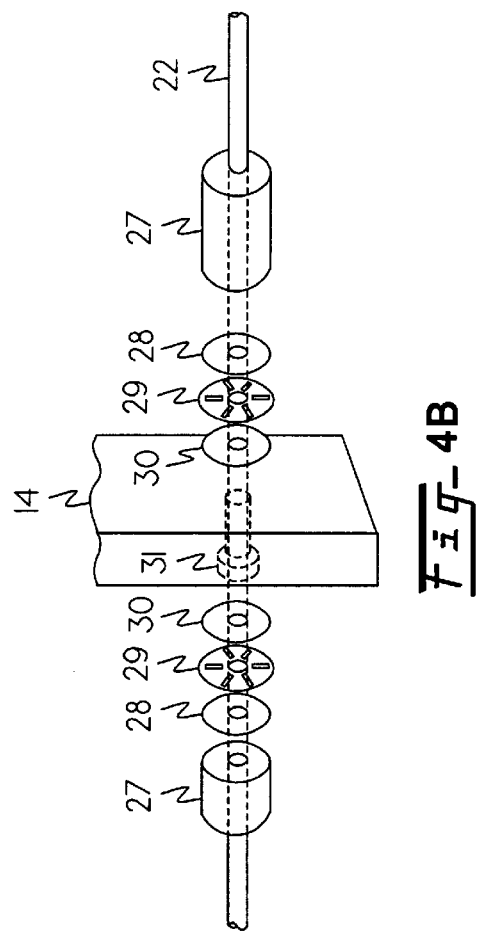

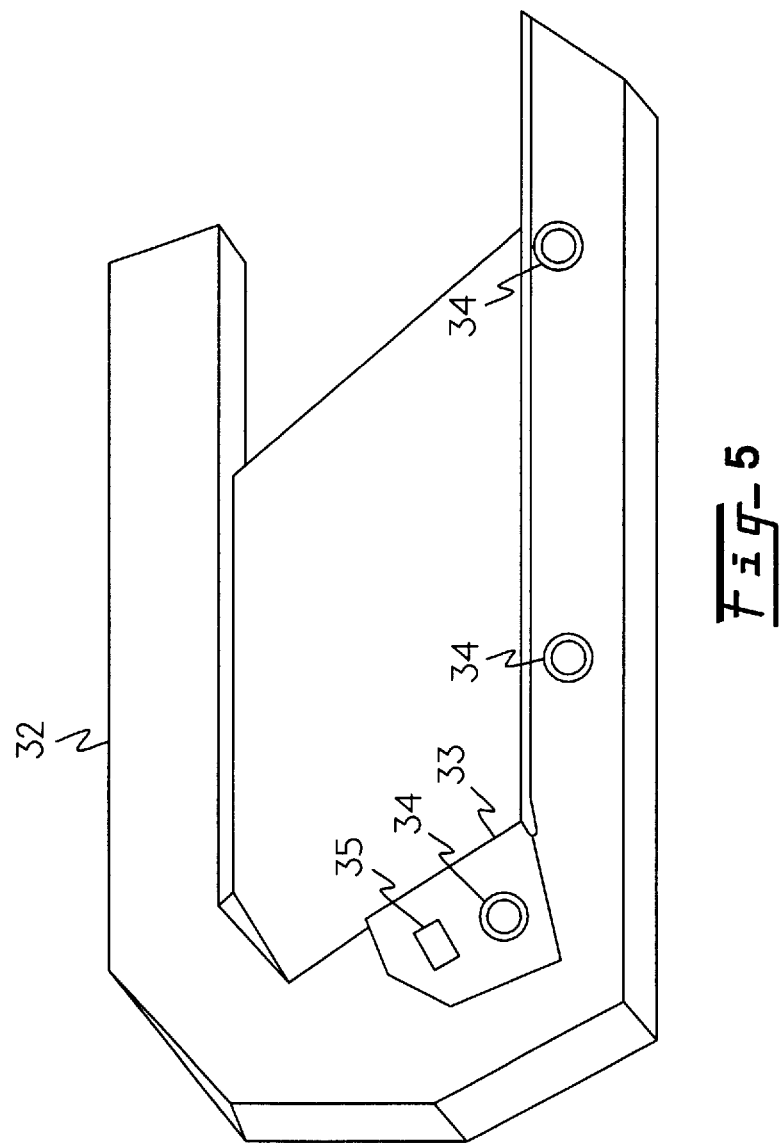

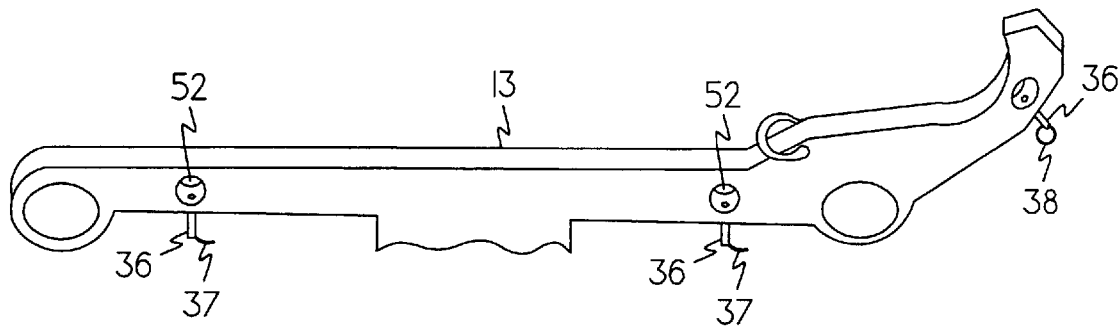
Fig_ 6A
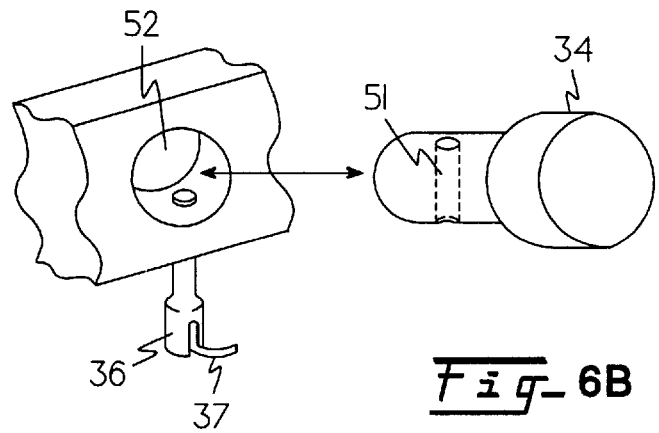
Fig_ 6B
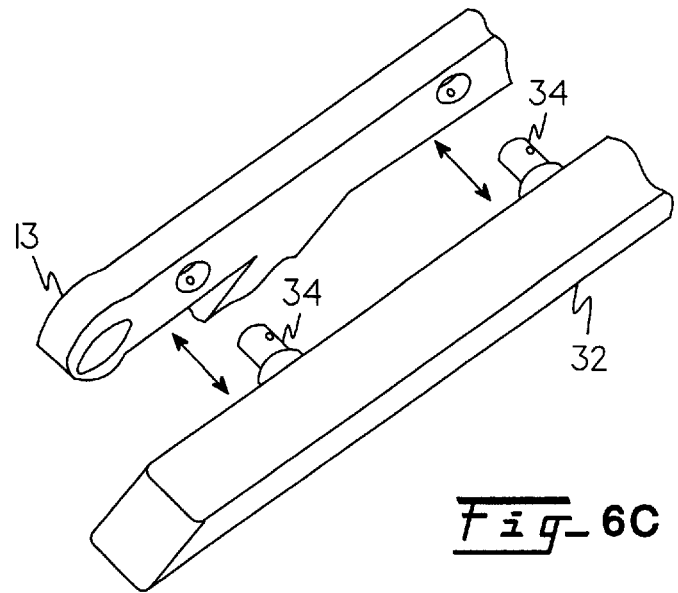
Fig_ 6C

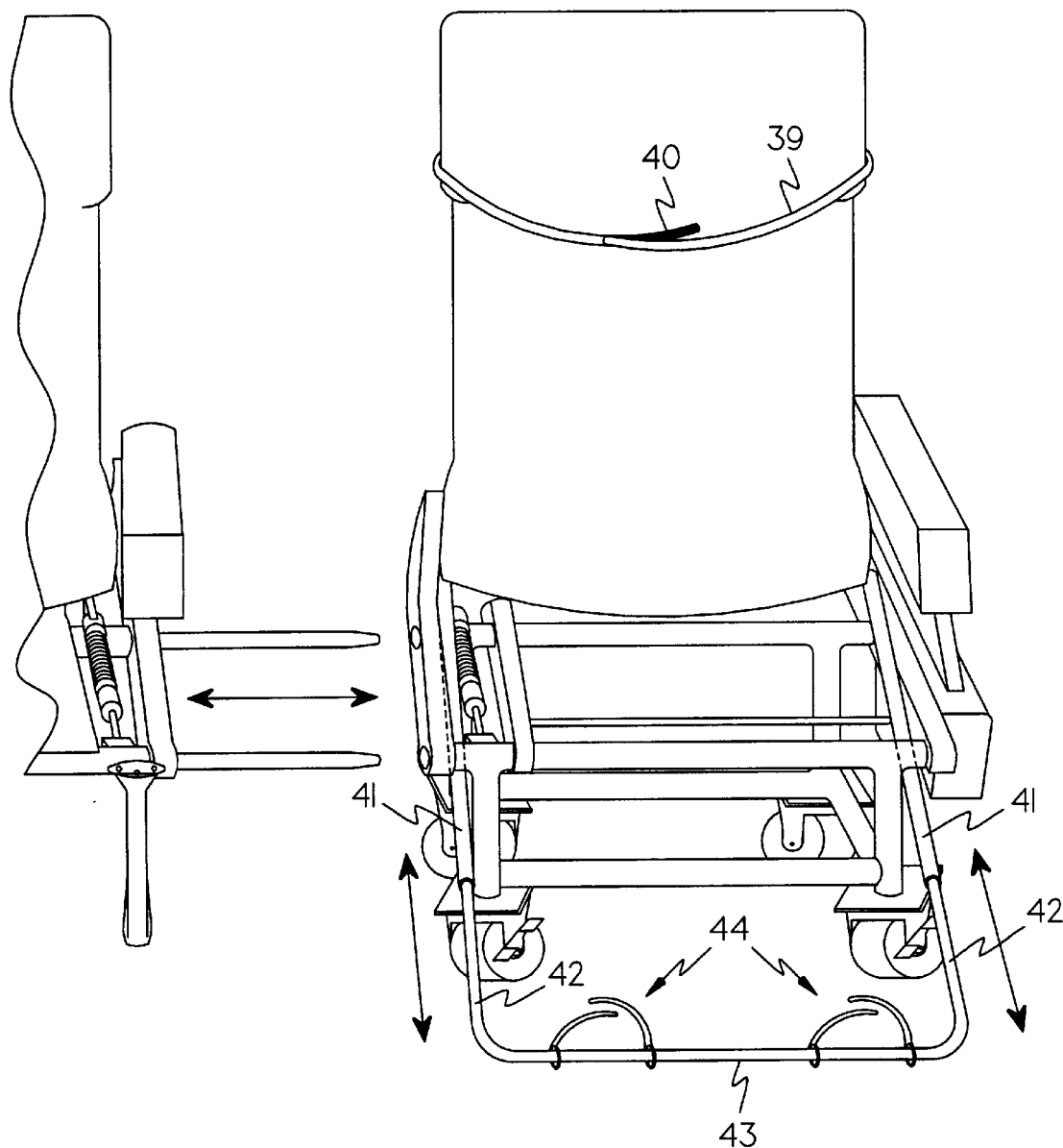
Fig_7

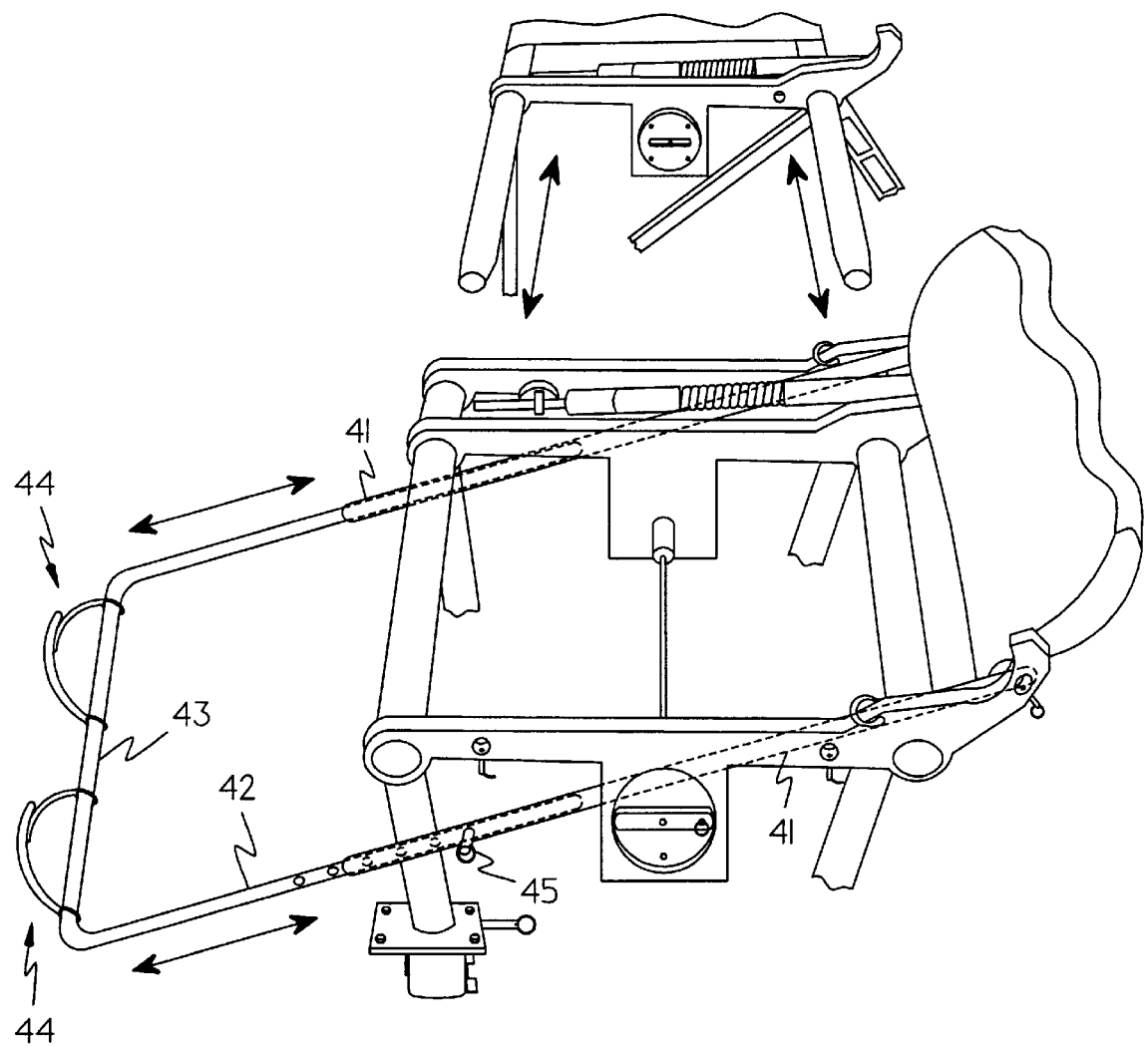
Fig_8

EASY TRANSPORT SEAT

FIELD

This invention relates to a means for transporting the physically challenged onto and out of a transportation vehicle such as an airplane, and more particularly to an easy transport seating system which can be easily and freely moved within the aisle of the transportation vehicle while not producing a hazard or an incumbrance on individuals who may wish to travel within the aisle; because the easy transport seating system occupies the same physical space as an ordinary seat.

BACKGROUND OF THE INVENTION

It is normally very difficult to transport physically challenged individuals to and from long range transportation vehicles such as airplanes or trains. The individual must typically be moved from a normal wheelchair to a second wheelchair capable of traveling through the aisle of the transportation vehicle. Once the second wheelchair reaches the designated aisle location, the occupant is transferred to the aisle seat of the transport vehicle. In certain situations, the arm of the aisle seat may be completely removed or otherwise maneuvered so as to facilitate access. In most cases however, the occupant must be physically lifted from the second wheelchair and above the arm of the aisle seat of the transportation vehicle in order to be seated. This procedure is often difficult due to the space constraints created by the transport vehicle's aisle and the adjacent seats. The procedure must then be reversed when the individual has to deboard the transportation vehicle. Furthermore, most commercial transport companies do not employ personnel with the physical capabilities to manually lift an individual from a wheelchair and into a passenger seat. In most cases several stewards and stewardesses engage in the relocation process. This often presents a painful and humiliating experience for a physically challenged person due to excessive mishandling. This situation results in bruises and discomforts that tend to discourage individuals from using commercial forms of transportation. Furthermore, the procedure is so difficult and time-consuming that it becomes dangerous in the event of an emergency. The end result is that physically challenged individuals tend not to use commercial forms of transportation because they feel inhumanely treated and sometimes spend the better part of their vacation recovering from the bruises incurred during travel and dreading another humiliating experience on the return trip. Oftentimes a passenger is unable to obtain a direct route to his destination and must make connections in order to reach his final destination. In such cases, the procedure of manipulating the passenger must be repeated each time a connection is made.

The prior art has focused on travel chairs capable of being placed onto the seat of a commercial transport vehicle. These units are capable of reducing the harm done to the occupant, but they do not reduce the labor necessary to lift the occupant and place him into the seat of the commercial transport vehicle.

For example, U.S. Pat. Nos. 4,229,039 and 4,113,307 each disclose a transportation chair capable of being folded and placed onto the existing seat of a commercial transport vehicle without the need to remove the occupant from the transportation chair.

U.S. Pat. No. 2,328,047 illustrates a stretcher which may be converted into a chair movable in the same manner as a hand truck. There are no means, however, that would allow the unit to be self-supporting. The occupant would therefore require undivided attention from at least one attendant; a situation which can increase the danger associated with an emergency.

Thus there exists a need for a transportation system for physically challenged individuals which allows them to easily and comfortably board and deboard commercial transportation vehicles while not inducing excessive encumbrance on the attendants and other passengers.

SUMMARY OF THE INVENTION

The present invention relates to a means for transporting physically challenged individuals to and from a seating location on a commercial transport vehicle. This is done by modifying the existing seating assembly in the commercial transport vehicle. Such assemblies typically consist of an aisle seat, a window seat, and sometimes a center seat located between the aisle seat and the window seat. The modifications are performed so that the aisle seat is transformed into an easy transport seat which may be detached from the seating assembly. The center seat is also slightly modified in order to secure the easy transport seat. The easy transport seat is reinforced so that it is capable of resisting at least the same amount of stress as the original seat, and wheels are attached to it. Locking means are provided to secure the easy transport seat to the seating assembly, while safety means prevent accidental detachments. A set of rods attached to and extending from the seating assembly are provided to resist the shear loading which might be encountered during travel or an emergency stop. Each rod has a tapered end so that it can also function as a guide for proper alignment when the easy transport seat is to be reattached to the assembly. The aisle side armrest is modified so that it may be removed in order to allow the easy transport seat to travel through the aisle and to further allow for the unimpeded transfer of the passenger. The armrest and easy transport seat include locking means which allow for easy operation by any trained individual. In certain embodiments, an upper torso strap may be incorporated to further secure passengers with limited coordination. The wheels of the easy transport seat incorporate locking and braking means which prevent them from turning and rotating, respectively.

The present invention provides a much more convenient, safe, and humane way of transferring a physically challenged individual from his wheelchair to the seat of a commercial transport vehicle. To perform this task, the easy transport seat is first removed from the seating assembly. It is then rolled down the aisle and into the terminal. Once inside the terminal, the wheels of the easy transport seat may be locked and the brakes applied so that it remains stationary while the occupant is transferred from his wheelchair to the seat. The terminal also provides ample space for the occupant to transfer himself or for the attendants to easily and safely assist him. Once the occupant has been transferred, the easy transport seat is negotiated back down the aisle and reattached to the seating assembly. This method reduces the number of seat to seat transfers along with the time required to move a physically challenged person to his seating location and is therefore an improvement over any currently employed system. Another benefit from having an easy transport seat stems from the fact that it may be detached and transported to the restrooms during flights of extended length.

The present invention employs minimal modifications to the original seat, so that a passenger sitting behind an easy transport seat is free to extend his legs underneath the easy transport seat. Furthermore, an easy transport seat functions just as a normal aisle seat functions and may be used by any passenger. It may be positioned ideally in place of any and all aisle seats. It may contain floatation devices, food trays, and a reclining seat back. Therefore the seat can be installed as part of the existing seating structure without modifications to the structural components of the commercial transport vehicle. In situations where transport connections must be made, seat to seat transfers may be eliminated due to the fact that the easy transport seat may be moved to the connecting transport vehicle and reattached to its seating assembly without ever removing the passenger from the easy transport seat.

The manner in which an easy transport seat is installed in different commercial transport vehicles is based upon the manner in which the seats are attached to the floor. In commercial transport vehicles, tracks are typically set into the floor and run from the front to the rear of the seating area. The seats are then set into the tracks and secured. In certain arrangements, none of the tracks are aligned beneath the aisle seats. Commercial transport vehicles with this configuration are more common and require very simple modifications to the center seat for the conversion of the aisle seat into an easy transport seat. In other track arrangements, at least one of the tracks is set beneath the aisle seat. These arrangements require that extensions be added to the support member.

It should be noted however that the modifications necessary for transportation vehicles which contain tracks beneath the aisle seat are minimal and may easily be performed by those skilled in the art. Therefore, the current invention should not be restricted to transport vehicles which do not contain tracks beneath the aisle seats.

OBJECTS OF THE INVENTION

It is therefore an object of, this invention to provide a transportation means for physically challenged individuals which allows for easy and comfortable transport into and out of commercial transport vehicles.

It is another object of this invention to provide a transportation means for physically challenged individuals which provides little encumbrance on attendants.

It is yet another object of this invention to provide a transportation means for physically challenged individuals which requires only a small amount of physical exertion by attendants.

It is yet another object of this invention to provide a transportation means for physically challenged individuals which may easily be maneuvered through seating aisles by one attendant.

It is yet another object of this invention to provide a seating system which provides easy access to restrooms during longer trips.

It is yet another object of this invention to provide a seating system capable of being used by able-bodied or physically challenged individuals without modification by incorporating all the attributes and functions of a normal seat.

It is yet another object of this invention to provide a transportation system for physically challenged individuals which will allow them to remain in the same seat throughout an entire trip without having to be transferred to a permanent seat once on board the commercial vehicle.

BRIEF DESCRIPTION OF THE DRAWINGS

FIG. 4(a) illustrates the locking mechanism which secures the easy transport seat to the seating assembly.

FIG. 4(b) is an enlargement of the thrust bearing assembly.

FIG. 5 illustrates the detachable arm with its guide plugs.

FIG. 6(a) illustrates the aisle side of the easy transport seat and the locking pins which secure its arm.

FIG. 6(b) is an enlarged view of one of the locking pins and its guide plug.

FIG. 6(c) illustrates the manner in which the detachable arm is secured to the seat.

FIG. 7 illustrates the easy transport seat with an optional torso restraint and means of supporting the occupant's feet.

FIG. 8 illustrates the manner in which the foot support is attached to the easy transport seat.

DETAILED DESCRIPTION OF THE DRAWINGS

Figure 1:
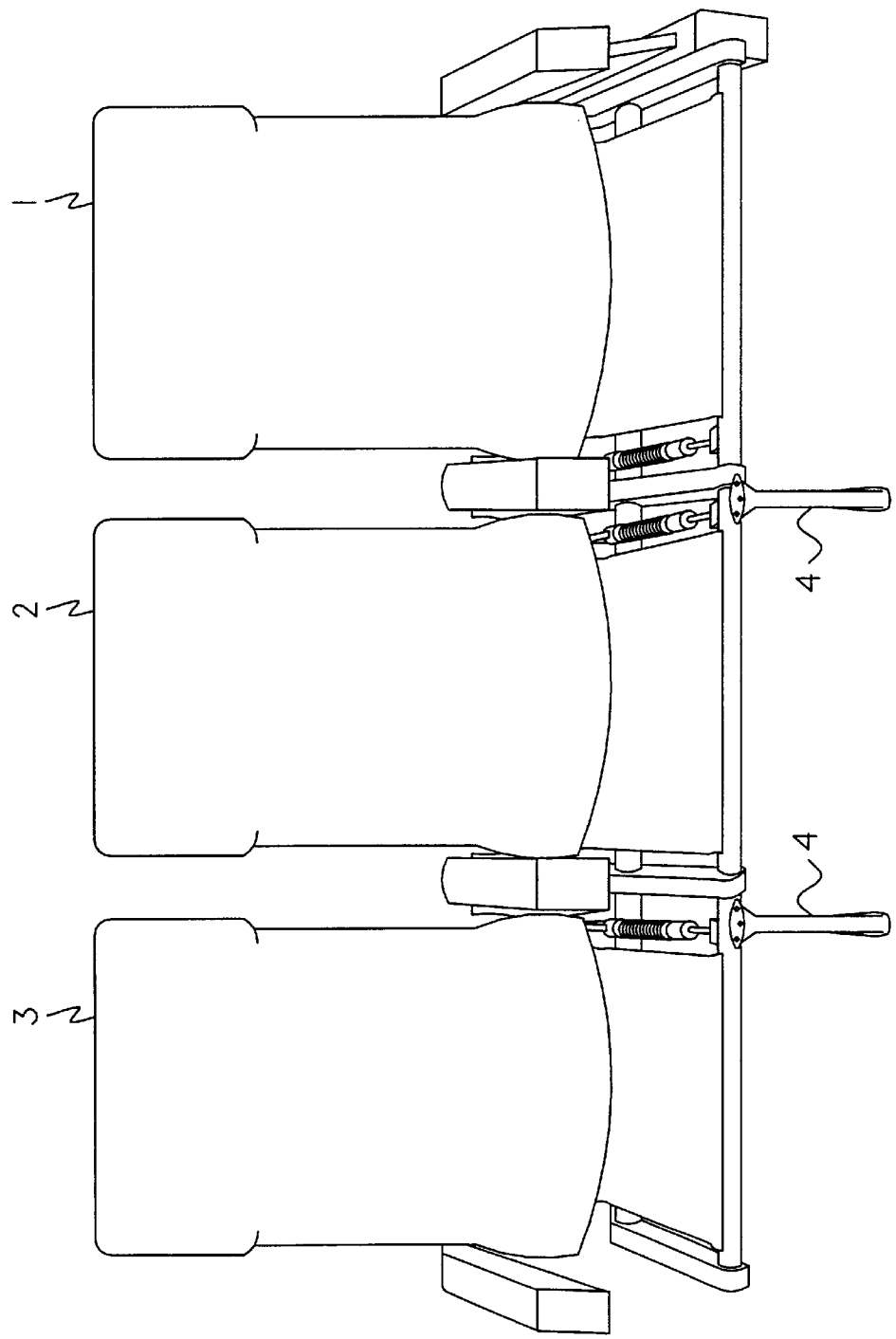
FIG. 1 illustrates a typical seating assembly with the seat cushions removed.

The seating assembly illustrated in FIG. 1 is typical of those found on commercial transport vehicles. It consists of an aisle seat 1, a center seat 2, and a window seat 3. All three seats are integrally connected to each other so that they lie on the same vertical and horizontal plane. The legs 4 of the center seat are secured to the floor and the aisle and window seat are cantilevered thereto.

Figure 2:
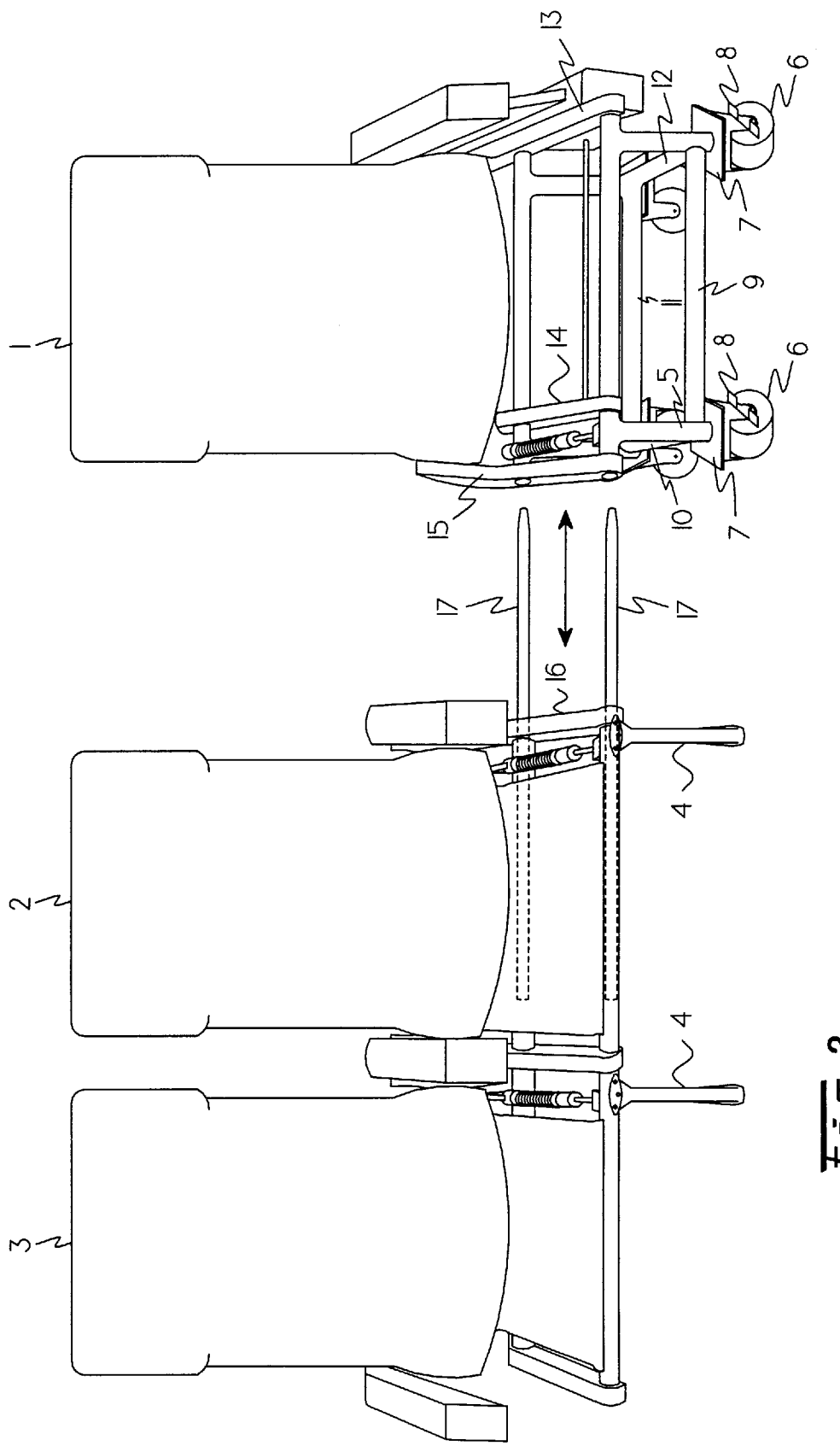
FIG. 2 illustrates a modified seating assembly having two standard seats and one easy transport seat. The underside support of the easy transport seat's cushion has been drawn back in order to expose the locking assembly.
Figure 3:
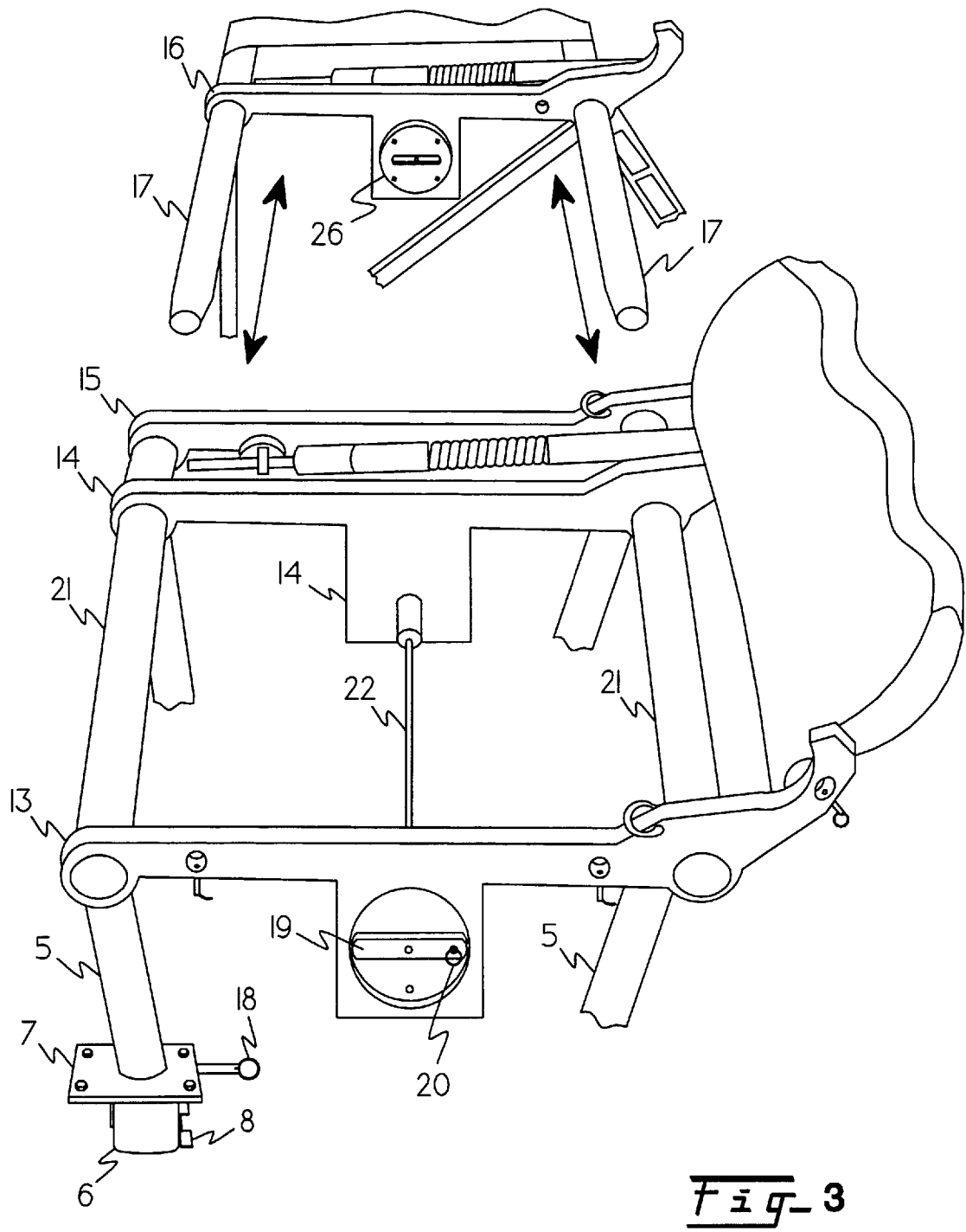
FIG. 3 is an illustration of the easy transport seat separated from the seating assembly after the armrest has been removed.

FIGS. 2 and 3 illustrate the manner in which an easy transport 1 seat would be arranged in a commercial transport vehicle and the means by which the easy transport seat 1 is engaged and secured. The easy transport seat 1 is modified so that it may be detached from the seating assembly. Legs 5 are added as a means of supporting the seat. The legs 5 are attached at one end to the receiver tubes 21. A mounting plate 7 is attached to the free end of each leg 5. A caster 6 is secured to each mounting plate 7. Each caster 6 is capable of swivelling a full 360 degrees. A friction brake 8 is also provided on each caster 6 in order to immobilize the easy transport seat when necessary. A first support member 9 is attached to the front legs at a position slightly above the respective mounting plates. A second support member 10 is attached to the front and rear legs of the window side of the easy transport seat. A third support member 11 is attached to the rear legs. A fourth support member 12 is attached to the aisle side of the seat. All four frame members lie on a plane parallel to the ground. Together, the four support members form a support cage which enhances the strength and stability of the easy transport seat.

A hand retractable plunger 18 is provided to either prevent the caster from swivelling by locking it at 90 degree increments or to allow it to swivel freely by unlocking it. The seat locking mechanism is engaged and disengaged by means of a seat lock control handle 19. The seat lock control handle 19 allows the T-lock to be turned, thereby securing the seat. Two guide arms 17 are inserted into the center seat 2 and secured thereto. The free end of each guide arm 17 is tapered. The guide arms 17 slidably engage a pair of receiver tubes 21 in the easy transport seat. The tapered ends of the guide arms 17 also serve as a guiding system when engaging the easy transport seat 1 to the remainder of the seating assembly. A first frame member 13 is mounted at either end to each receiver tube and forms the main support to which the arm of the easy transport seat is attached. A second frame member 14 is mounted at either end to each receiver tube in order to provide a reaction surface for the seat's locking mechanism as well as the support needed to maintain the seating assembly in position. A third frame member 15 is fastened at either end to each receiver tube 21 and serves as an anchor point for the reclining mechanism. A fourth frame member 16 is attached to the window seat or center seat, if one is provided, and functions as a base to which the T-lock receiving drum 26 is mounted. All four frame members are aligned so that the locking assembly may function properly.

FIGS. 4A and 4B illustrate the details of the locking mechanism. Disengaging the spring loaded detent lock pin 20 allows the seat control handle 19 to turn into either of two detented positions 23 on the surface of the first frame member 13. The seat lock control handle 19 is attached to the outboard end of a shaft 22. A Teflon anti-friction washer 24 is positioned between the surface of the first frame member 13 and the seat lock control handle 19 in order to reduce contact friction between the two surfaces. The contact surfaces of the first frame member 13 and the seat lock control handle 19 could also be coated with any lubricant available such as Teflon to accomplish this purpose. A T-lock 25 is attached to the opposite end of the shaft 22. Two thrust bearing assemblies are mounted along the shaft 22 to engage the second frame member 14 from either side. Each bearing assembly consists of a locking shaft collar 27, a first thrust washer 28, a thrust bearing 29, and a second thrust washer 30. A brass bushing 31 is inserted through the aperture of the second frame member 14 in order to allow for smooth rotation of the shaft 22. A T-lock receiving drum 26 is attached to the fourth frame member 16 at a height parallel to the T-lock 25. When the T-lock 25 is rotated to the unlocked position by means of the control handle 19, it becomes aligned with the matching slot in the receiving drum 26. The easy transport seat 1 may then be butted against the seating assembly, thus inserting the T-lock 25 into the receiving drum 26. Once inserted, the T-lock 25 is rotated 90 degrees clockwise and the easy transport seat is secured to the assembly.

FIG. 5 illustrates the arm 32 of the easy transport seat 1 and the modifications which have been made to it. A plate 33 is fastened to the arm 32 in order to provide a mounting surface for the first guide plug 34 and to act as a support structure for the passenger's weight. A modified boss 35 protrudes through the plate 33 in order to provide support and act as a stop when attaching the arm 32 to the easy transport seat 1. A second and third guide plug 34 have also been added to the seat arm 32. Each guide plug has a threaded aperture which facilitates attachment to the seat arm 32.

Turning now to FIGS. 6A, 6B, 6C, the manner in which the arm 32 is attached to the easy transport seat 1 is illustrated. The first frame member 13 contains a plurality of apertures 52 equal in number to and aligned with the guide plugs 34 attached to the arm 32.

Each guide plug 34 contains a transverse bore which is aligned with and receives a hand retractable plunger 36. Once the arm 32 has been aligned and engaged with the side of the seat, the hand retractable plungers 36 are released and the arm is secured.

A variety of convenience and safety features may also be incorporated in the easy transport seat, as illustrated in FIGS. 7 and 8. For example, it is not always possible for the occupant of the easy transport seat to fully support his upper torso. There are a variety of options available to accomplish this. An upper torso restraint 39 may be adapted to the easy transport seat and attached at a height appropriate for restraining an occupant's torso. The upper torso restraint may operate in the same manner as a seatbelt and it may utilize a buckle or velcro 40 for security.

Another problem which tends to inconvenience occupants of commercial transport seats is the lack of support means for the legs. Again there are many ways to provide support for the occupant's legs. A telescoping leg assembly is illustrated fastened to either side of the easy transport seat. The telescoping leg assembly consists of an outer tube 41 attached at one end to the first frame member and attached at the other end to the front leg. An inner tube 42 is slidably inserted into each of the outer tubes. The inner tubes are integrally attached to a cross tube 43 which functions as a foot rest. A plurality of straps 44 are attached to the cross tube in order to secure the occupant's feet. A spring-loaded lock pin 45 is provided on each of the outer tubes in order to secure the inner tubes in a retracted position when they are not in use. A net may also be attached to each telescoping tube and extended to provide support for the occupant's legs. The same support may also be obtained by mounting a support plate to the free end of each leg. The support plate is capable of being pivoted about the telescoping tube. When the telescoping legs are in use, they are first fully extended. Next, the support plates are pivoted so that the occupant's legs may rest on them.

In the normal mode of operation, the arm 32 of the easy transport seat is first removed in order to access the seat lock control handle 19. To do this, the attendant disengages the hand retractable plungers 36 and sets the locking pins 37 to the open position. Next, the pull ring plunger 38 attached to the aperture for receiving the first guide plug 34 is disengaged while simultaneously pulling the arm 32 away from the seat. The combination of hand retractable and pull ring plungers provides a very safe and convenient method of removing the arm. In the event that the hand retractable plungers were accidentally left disengaged, the arm of the seat would remain attached solely by means of the pull ring plunger. Once the control handle 19 is accessed, the T-lock 25 can be disengaged. The attendant simply disengages the pull ring plunger 20 which secures the control handle 19 in the locked or unlocked position by pulling on it and simultaneously rotating the control handle 19 to the unlocked position and releasing the pull ring plunger 20. The easy transport seat 1 can now be detached from the seating assembly by pulling it towards the aisle. Once the easy transport seat has cleared the guide arms 17, a slight push or pull in the next intended direction of travel will force the casters 6 to rotate to the appropriate position. The attendant may then engage the locking pins 18 of the two rear casters 6 in order to lock the wheels into an appropriate position for forward motion and to more easily maneuver the easy transport seat down the aisle. The seat is then rolled into the terminal where the occupant can be easily transferred. Prior to transfer, the friction brakes 8 on all four casters 6 should be engaged so as to eliminate any motion of the seat. Once the occupant has been transferred to the easy transport seat, his seat restraint should be secured and his wheelchair may be folded and stored aboard the aircraft. The locking pins 18 of the front casters 6 may then be engaged while the locking pins 18 on the rear casters 6 are disengaged so that the easy transport seat is easily steered while being pulled back to its original position. Once returned, all the locking pins 18 of the individual casters must be disengaged in order to allow sideways motion and maximum mobility in realigning the seat. The tapered ends of the guide arms 17 provide plenty of room for adjustment as the easy transport seat is realigned. Once the tapered ends of the guide arms 17 are inserted in the receiver tubes 21, the easy transport seat 1 may be simply pushed into the seating assembly as the guide arms 17 will force it into the proper alignment. At this point, the pull ring plunger 20 is again disengaged and the control handle 19 is rotated into the locked position, thereby securing the easy transport seat to the seating assembly. The arm can then be locked into place.

What is claimed is:

1. A system for transporting physically challenged individuals, comprising:
   a fixed seat assembly having a lower frame operatively arranged to be permanently secured to a floor, and having a seat secured to said lower frame;
   a movable seat assembly having a seat supported by a lower frame, said lower frame supported by rolling means which enable said movable seat assembly to be moved from place to place with said physically challenged person in place upon the seat of the movable seat assembly; and,
   locking means located on the lower frame of said movable seat assembly operatively arranged to engage the lower frame of the fixed seat assembly to lock said movable seat assembly to said fixed seat assembly.

2. An apparatus as recited in claim 1, said fixed and movable seat assemblies, respectively, each comprising means for aligning said movable seat assembly with said fixed seat assembly to facilitate securing said movable seat assembly to said fixed seat assembly.

3. An apparatus as recited in claim 2, said alignment means comprising at least one guide arm emanating and projecting forth from said fixed seat assembly and at least one corresponding receiver tube within said movable seat assembly, said guide arm operatively arranged to slidingly engage said receiver tube.

4. An apparatus as recited in claim 1, said means for securing comprising a stationary female locking receptacle having a T-lock receiving drum mounted on said fixed seat assembly frame and a rotatable T-lock member mounted to said movable seat assembly frame, said T-lock member operatively arranged to engage and lock within said T-lock receiving drum.

5. An apparatus as recited in claim 1 wherein said movable seating assembly is mounted on casters.

6. An apparatus as recited in claim 5 wherein said casters swivel and roll.

7. An apparatus as recited in claim 6 further comprising means for preventing, independently, each of said casters from swiveling.

8. An apparatus as recited in claim 7 further comprising means for preventing, independently, each of said casters from rolling.

9. An apparatus as recited in claim 1 wherein said movable seat frame assembly further comprises a removable arm rest which is operatively arranged to be removed to facilitate transport of a person into and out of the movable seat assembly.

10. An apparatus as recited in claim 1 further comprising means for securing the torso of a person seated within said movable seat assembly.

11. An apparatus as recited in claim 9 wherein said removable arm rest is operatively arranged to hide and render inaccessible said means for securing when said removable arm rest is mounted to said movable seat assembly.

12. An apparatus as recited in claim 10 wherein said means for securing the torso comprises an upper torso restraint attached to said movable seat assembly at a height sufficient to provide engagement across a person's upper torso when the person is seated in the movable seat assembly.

13. An apparatus as recited in claim 1 further comprising means for supporting the legs of a person seated within said movable seat assembly.

14. An apparatus as recited in claim 13 wherein said means for supporting the legs comprises a pair of telescoping foot rests.

15. An apparatus as recited in claim 13 wherein said means for supporting the legs comprises a pair of removable foot rests.

16. A system as recited in claim 1 wherein said rolling means comprises casters.

17. A system as recited in claim 1 wherein said rolling means comprises wheels.

* * * * *